United States Patent Office 3,015,499
Patented Jan. 2, 1962

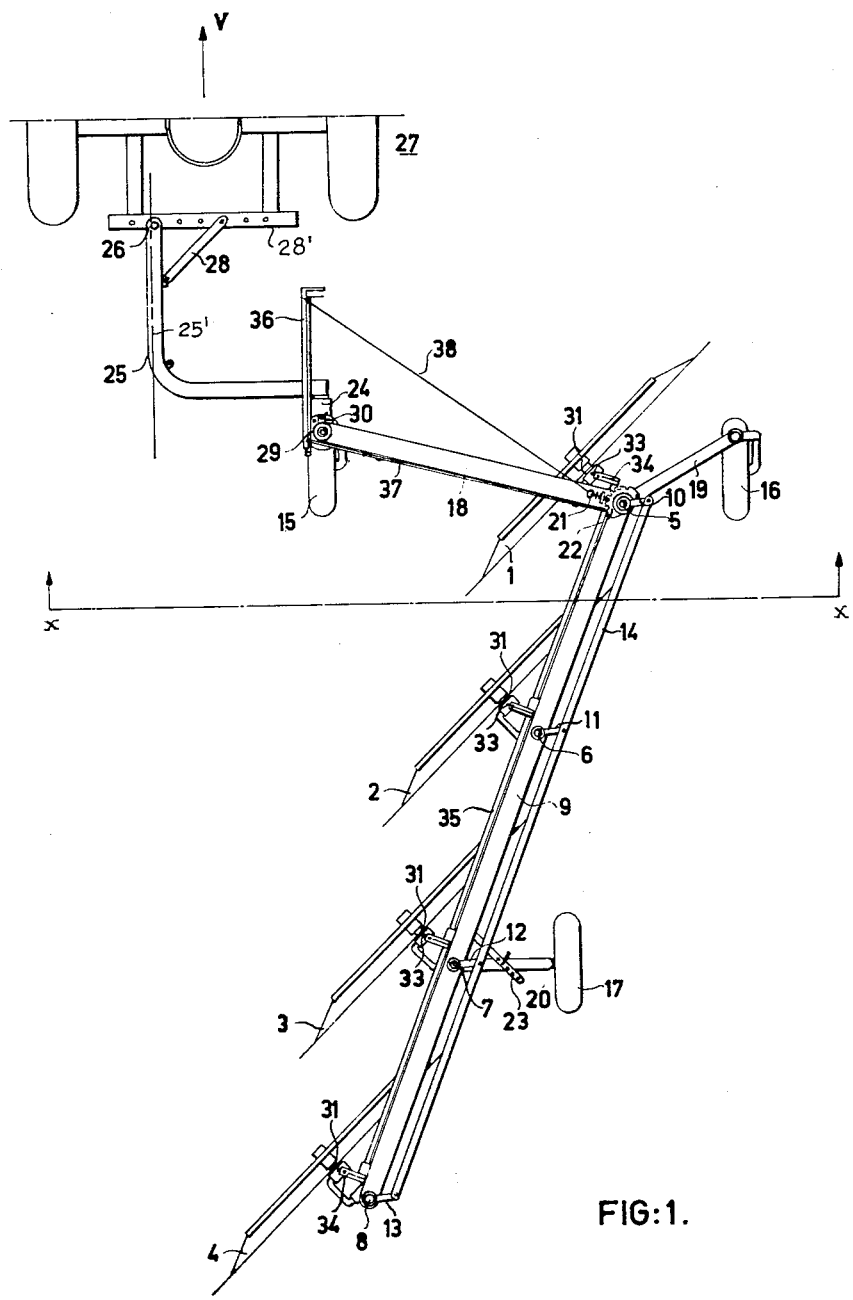
FIG:1.

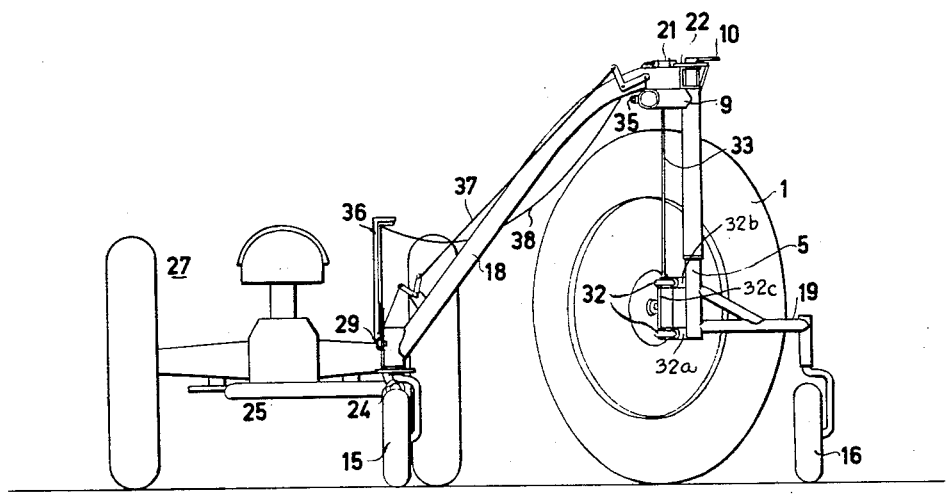
FIG: 2.

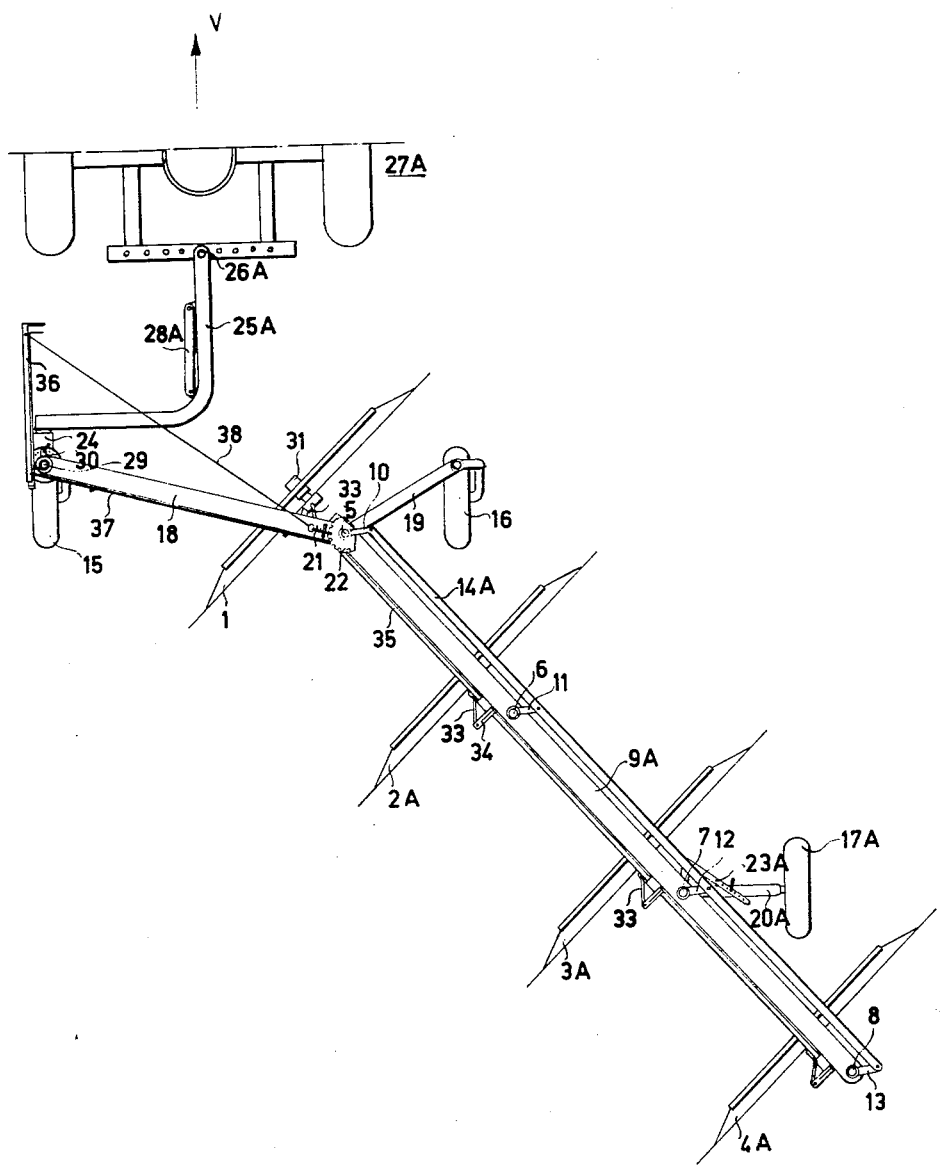
FIG: 3.

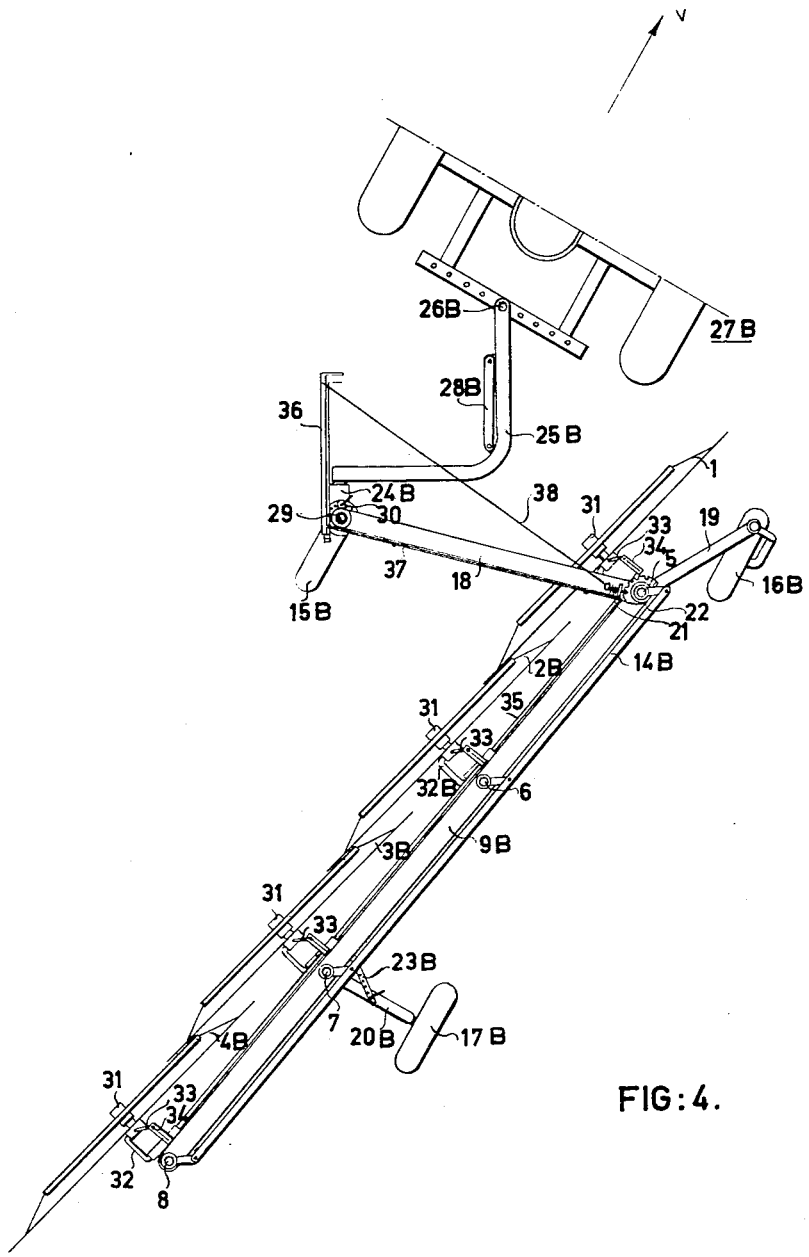
FIG:4.

3,015,499
AGRICULTURAL MACHINE, PARTICULARLY COMBINED SIDE DELIVERY RAKE-TEDDER
Cornelis van der Lely and Ary van der Lely, Maasland, Netherlands, assignors to C. van der Lely N.V., Maasland, Netherlands, a Dutch limited liability company
Filed June 26, 1956, Ser. No. 594,023
Claims priority, application Netherlands June 29, 1955
2 Claims. (Cl. 280—456)

The invention relates to agricultural machines and more particularly to machines adapted for working as side delivery rakes and tedders.

Machines are known of the type including an arm on which a force is exerted for causing the associated machine to move in a determinable direction of travel. Frequently, the arm is rotatable about a horizontal axle. In these machines, tractive power can be exerted only at one point with respect to the associated machine.

It is an object of the present invention to provide an improved arrangement in which a draw arm is not so limited in use. Consequently, according to the invention, a force for propelling a machine can be exerted at a plurality of positions.

It is a further object of the invention to provide that the difference of height between an agricultural machine and an associated tractor has no prejudicial influence on the working of the agricultural machine.

Further objects as well as advantages of the invention are next more fully described with reference to the annexed drawings in which:

FIG. 1 is a plan view of a side-delivery rake having a draw arm according to the invention, FIG. 2 shows a section of the same implement in the direction of the arrows and according to the line X—X indicated in FIG. 1, FIG. 3 is a plan view of a tedder, the draw arm having a modified working position, FIG. 4 is a plan view illustrating the transport position of the device.

In FIG. 1, four rake wheels 1, 2, 3 and 4 are mounted on a frame 9 so as to be rotatable about vertical axles 5, 6, 7 and 8. The vertical axles 5, 6, 7 and 8 are provided with projections or flanges 10, 11, 12 and 13 and are hingedly connected to a coupling bar 14.

The frame is supported by running wheels 15, 16 and 17 which are fixed to the vertical axles 5 and 7 by means of supporting members 18, 19 and 20. By means of a locking pin 21 which is mounted on the supporting member 18 and which locking pin engages a toothed sector 22 fixed on the frame 9, the running wheels and the rake wheels are secured in position with regard to the frame 9 (see also FIG. 2).

The running wheels 15 and 16 are self-adjusting. The running wheel 17 is not self-adjusting, but its supporting member 20 is attached rotatably relative to the rake wheel 3 and is secured by means of a coupling bar 23. The rake wheel 3 and the running wheel 17 are jointly rotatable about the vertical axle 7.

In close proximity to the running wheel 15 and on frame 9, a horizontal axle or hinge 24 is mounted in which a draw arm 25 is rotatably accommodated. The draw arm 25 which defines an axis of rotation 25' is coupled to a pulling device or tractor 27 at one end by a vertical pivot 26 rotation about which is controlled by a bar 28 which engages a perforated bar 28' on the tractor.

A vertical hinge or axle 29 is supported above the horizontal hinge or axle device, and the draw arm 25 which is an L-shaped member is rotatable at its other end about said axle 29. The draw arm 25 is adjustably secured to said axle by means of a locking device or pin 30.

The rake wheels 1, 2, 3 and 4 are supported on the axles 31 which are mounted on parallelograms 32. As shown in FIG. 2, the parallelograms consist of at least three pivotally connected links 32a, b and c. The parallelograms 32 constitute the connections between the rake wheels 1, 2, 3 and 4 and the axles 5, 6, 7 and 8 whereby the rake wheels are vertically displaceable relative to said axles.

The bars 33 are attached by respective of their ends to said parallelograms. The other ends of the bars 33 are connected to the projections 34 on the axle 35. The axle 35 is rotatable so that the rake wheels can be raised by means of a lever 36, a system of bars 37 and a cable 38.

In FIG. 1, the device works as a side-delivery rake. The tractor 27 is located at a favorable position with regard to the side-delivery rake, because the rake projects from the tractor at one side and because of the fact that it is possible to rake easily along the sides of a field. The tractor further has a favorable position for meeting the resistance caused by the rake wheels which are obliquely arranged with regard to the direction of travel. Moreover, the lever 36 is within reach of the driver's seat.

If it is desired to convert the side-delivery rake into a swath turner by using the engine power of the tractor, the bar 28 is mounted to eliminate the possibility of turning about the pivot 26, as is shown in FIG. 1. The locking pin 21 is then pulled back by means of the cord 38. By causing the tractor 27 to make a turn to the right, the frame 9 is turned about he vertical axle 5. The rake wheels 2, 3 and 4 and the running wheel 17 turn with respect to the frame 9 and with these elements in position as shown in FIG. 3, the locking pin 21 is released, due to which it again secures axle 5 in position. The draw arm 25 and the bar 28 are then released from the tractor 27 and the draw arm 25 is turned 180° about the axle 24 whereupon the draw arm is coupled anew to the rear of the tractor.

In the arrangement shown in FIG. 3, the device works as a teddering device. The rake wheels 1, 2A, 3A and 4A each rake a small strip and throw the material aside in a tousled state in which it can be aired. The running wheels 15, 16 and 17A have a favorable position for performing said work. The draw arm 25A permits to the tractor 27A to assume favorable position relative to the machine for making sharp turns as well as for overcoming the resistance caused by the rake wheels arranged obliquely with respect to the direction of travel. The lever 36 remains within the reach of the driver of the tractor 27A.

In FIG. 4, the device is shown in transport position. The locking pin 21 is retracted from the toothed sector 22. The coupling bar 28B is connected to the rear end of the tractor 27 and the rear end of the tractor is turned to the right until the position of FIG. 4 is reached. After the locking pin 21 again locks the axle 5 and after the bar 28B is released from the tractor, the device can be transported in a favorable manner. For this operation, the rake wheels 1, 2B, 3B and 4B are raised by means of the lever 36. If desired the draw arm 25B can be adjusted about the vertical axle 29. After the coupling bar 23B is released, the running wheel 17B together with the supporting member 20B is turned with regard to the rake wheel 3B and is fixed by securing the coupling bar 23B. The running wheel 17B then steers the device in a favorable transport position.

What we claim is:

1. A hitch for coupling an agricultural implement to a pulling device comprising a draw arm, a vertical pivot operatively associated with said draw arm to enable a pivoting thereof in a horizontal plane, said pivot being adapted for connection to said pulling device, a horizontal axle device operatively associated with said draw arm for connection to said implement, said horizontal axle device enabling the connection of said implement independently of the rotational disposition of said draw arm, a vertical hinge supported on said axle device for coupling the implement to the axle device and enabling a pivoting of the implement thereabout, a supporting member coupled to said hinge and connectible to the implement, said supporting member being pivotable on said hinge for positioning said implement, a locking device operatively associated with said hinge for restricting the pivoting of the supporting member, an axle supported on the supporting member and, in turn, coupled to the implement, and a toothed sector and pin positioned in mutually engageable relation on said axle and said implement for fixing the relative positions of the supporting member and implement.

2. A hitch as claimed in claim 1 comprising a lever pivotally connected to the supporting member and a cable coupling the pin and said lever.

References Cited in the file of this patent

UNITED STATES PATENTS

| | | |
|---|---|---|
| 1,380,352 | Carlson | June 7, 1921 |
| 1,632,013 | Trauger | June 14, 1927 |
| 1,646,342 | Barry | Oct. 18, 1927 |
| 1,882,868 | O'Donnell | Oct. 18, 1932 |
| 2,430,770 | Hyler | Nov. 11, 1947 |
| 2,495,818 | Oerman | Jan. 31, 1950 |
| 2,597,828 | Spurlin | May 20, 1952 |
| 2,650,102 | Goodspeed | Aug. 25, 1953 |
| 2,702,193 | Taylor et al. | Feb. 15, 1955 |

FOREIGN PATENTS

| | | |
|---|---|---|
| 64,990 | Netherlands | Dec. 15, 1949 |
| 121,429 | Sweden | Apr. 13, 1948 |
| 474,896 | Canada | July 3, 1951 |